United States Patent [19]
Ward

[11] Patent Number: 5,594,167
[45] Date of Patent: Jan. 14, 1997

[54] GAS METER HAVING CAM FOR RECIPROCATING VALVE COVERS AND RELATED METHODS

[75] Inventor: Edward R. Ward, Crittenden, Ky.

[73] Assignee: Schlumberger Industries, Inc., Norcross, Ga.

[21] Appl. No.: 435,596

[22] Filed: May 5, 1995

[51] Int. Cl.⁶ ..................................................... G01F 15/10
[52] U.S. Cl. ............................................... 73/274; 73/262
[58] Field of Search .............................. 73/239, 240, 241, 73/244, 245, 249, 262, 264, 267, 268, 274, 279

[56] References Cited

U.S. PATENT DOCUMENTS

| | | | |
|---|---|---|---|
| 1,223,875 | 4/1917 | Heeley | 73/268 |
| 3,369,398 | 2/1968 | Porter et al. | 73/268 |
| 3,589,189 | 6/1971 | Douglas | 73/268 |
| 4,008,425 | 3/1977 | Dickey | 318/314 |
| 5,415,032 | 5/1995 | Swain et al. | 73/263 |

FOREIGN PATENT DOCUMENTS

| | | | |
|---|---|---|---|
| 57-91683 | 6/1982 | Japan . | |
| 2052763 | 1/1981 | United Kingdom | 73/267 |

*Primary Examiner*—Richard Chilcot
*Assistant Examiner*—Max H. Noori
*Attorney, Agent, or Firm*—Leonard W. Pojunas

[57] ABSTRACT

A gas meter includes a cam for driving first and second valve covers associated with respective diaphragms. Gas flowing into the gas meter is selectively directed by the first and second valve covers to reciprocate respective diaphragms. First and second cam rotation assemblies are coupled to respective diaphragms and continuously drive a cam to rotate the cam through a complete revolution, a feature which provides accurate metering of gas flows out of the gas meter, and a relatively steady flow of gas out of the gas meter. Further, the gas meter of this invention requires relatively few parts and so is relatively reliable and easy to manufacture.

13 Claims, 7 Drawing Sheets

GAS METER HAVING CAM FOR RECIPROCATING VALVE COVERS AND RELATED METHODS

BACKGROUND OF THE INVENTION

1. Field of the Invention

This invention is related to a gas meter for determining usage of gas products by consumers, and more particularly, to a gas meter having cam-driven reciprocating valve covers.

2. Description of the Related Art

Gas meters have long been used to determine the amount of gas usage by consumers. Particularly where gas flow rates are relatively low such as at the gas inlets of houses and small buildings, for example, diaphragm meters are typically used to measure gas consumption at these locations. Diaphragm meters are usually positioned in an enclosed housing which communicates with a pipe which receives pressurized gas from an external source. Another pipe runs from the diaphragm meter to the inside of the house or building. When a gas burning device such as a stove or furnace is activated, gas begins to flow into the enclosed housing, through the diaphragm meter and into the pipe leading to the activated gas-burning unit. The diaphragm meter measures the amount of gas consumption in the following manner. Initially, a valve cover on the diaphragm meter is in a first position in which gas flows from the enclosed housing into one side of the valve cover through a passage leading to a first side of the diaphragm or bellows enclosed in the diaphragm meter. As the first side expands outward under pressure from the gas flowing from the enclosed housing, gas on the opposite side of the diaphragm is forced toward a second side of the valve cover which guides this gas flow to the inlet pipe via passages defined in the diaphragm meter. The force of this expansion of the first side of the diaphragm also drives a flag coupled to the diaphragm, which rotates a flag axle with an arm attached at one end. The arm forces a meter axle to rotate. The meter axle then rotates dials to indicate the amount of gas usage. The meter axle also has a crank shaft attached to an arm that reciprocates the valve cover so that the valve cover will change position as the diaphragm is driven from its first side. This change in position of the valve cover uncovers another passage which is exposed to the pressurized air in the enclosed housing in which the gas meter sits. The aperture at the second side of the valve cover allows gas to flow to a second side of the diaphragm or bellows and forces it to reciprocate back to its initial position. As the pressurized gas forces the diaphragm to expand in the opposite direction, the gas on the first side of the diaphragm meter is forced out of containment in the diaphragm meter against the valve cover which guides this gas flow toward the pipe leading to the gas-burning unit. The pressurized gas entering the second side of the diaphragm also drives the meter axle via the arm, flag axle and flag attached to the diaphragm.

As previously stated, to reciprocate the valve cover, the meter axle has a crankshaft attached to an arm that is coupled to the valve cover. This crankshaft and its associated components are relatively difficult to manufacture. In addition, the crankshaft is not entirely reliable as it is not driven uniformly throughout the cycle of the diaphragm, but is only driven when the diaphragm is forced in one direction or the other by pressurized gas. Thus, the crankshaft can become stuck, a feature which leads to inaccurate metering of gas consumption and erratic gas flow in the pipe to the gas-burning unit.

SUMMARY OF THE INVENTION

This invention overcomes the deficiencies described above. In accordance with this invention, a gas meter includes a housing which defines first and second cavities. The housing also defines an outlet passage with first and second ends. Further, the housing defines first and second passages on opposite sides of the outlet passage in proximity to the first end of the outlet passage. Similarly, in proximity to the second end of the outlet passage, the housing defines third and fourth passages on opposite sides of the outlet passage. A first diaphragm is mounted by its edges to the housing in the first cavity so that the first and second passages communicate with opposite sides of the first diaphragm. Similarly, a second diaphragm is mounted by its edges to the housing in the second cavity so that the third and fourth passages communicate with opposite sides of the second diaphragm. A first cam rotation assembly is coupled between the first diaphragm and a cam linkage assembly. The cam linkage assembly is coupled to rotate a cam mounted to the housing. Also, a second cam rotation assembly is coupled between the second diaphragm and the cam linkage assembly to rotate the cam. A first arm is coupled between the cam and a first valve cover, to reciprocate the first valve cover between a first position of the first valve cover in which the first valve cover uncovers the first passage and couples the second passage to the outlet passage and a second position of the first valve cover in which the first valve cover uncovers the second passage and connects the first passage with the outlet passage. A second arm is coupled between the cam and a second valve cover, to reciprocate the second valve cover between a first position of the second valve cover in which the second valve cover connects the fourth passage to the outlet passage and uncovers the third passage, and a second position of the second valve cover in which the second valve cover connects the third passage to the outlet passage and uncovers the fourth passage.

In operation, the gas meter of this invention is positioned in a gas meter housing which receives pressurized gas from an external source. The outlet passage of the gas meter is coupled to an inlet pipe supplying gas to a house or building, for example. When a valve in a stove or furnace, for example, is opened in the house or building, pressurized gas flow from the gas meter housing into the gas meter via one of the first and second passages and/or the third and fourth passages, and out of the gas meter via the outlet passage. The flow of gas into the gas meter drives the cam to rotate. Based on the rotation of the cam, the gas flow in the outlet passage is metered. To indicate the amount of gas flow over time, a cam shaft coupled to the cam can be coupled with gears to a dial which indicates the gas flow. Alternatively, gas pressure pulses in the pipe to the gas-burning unit can be monitored with a pressure sensor generating a signal coupled to a display indicative of the amount of gas usage over time. Alternatively, an optic eye can be positioned to detect the movement of a member coupled to the cam, past the optic eye as the member rotates with the cam. Still further, a magnetic sensor can be associated with one of the first and second diaphragms to detect the reciprocation of the diaphragm and generate a display based on the output of the magnetic sensor.

More specifically, the operation of the gas meter is as follows. Initially, assume that the first valve cover is in its first position in which the first passage is uncovered and the second passage is connected to the outlet passage. At this point in the cycle of the gas meter, the second valve cover is in a neutral position with its U-shaped channel overlying the outlet passage and both the third and fourth passages are covered by the second valve cover. Pressurized gas flows into the first passage and drives a first side of the diaphragm in a first direction. As the first diaphragm is driven in the first direction, the first cam rotation assembly coupled to the first diaphragm, is also driven to rotate the cam via the cam linkage assembly. Also, the driving of the first diaphragm in the second direction causes gas on the second side of the diaphragm to be forced out of the second passage to the outlet passage connected by the first valve cover. As the cam rotates 90° relative to its initial position, the first valve cover assumes a neutral position in which its U-shaped channel overlies the outlet passage and covers the first and second passages. At this point in the cycle of the gas meter, the second valve cover is driven by the cam so that the third passage is uncovered and the fourth passage is connected to the outlet passage by the U-shaped channel defined in the second valve cover. Pressurized gas enters the third passage and forces the second diaphragm in the first direction, thereby forcing gas on the second side of the second diaphragm out of the fourth passage to the outlet passage via the U-shaped channel of the second valve cover. The forcing of the second diaphragm in the first direction also drives the cam to rotate via the second cam rotation assembly. As the cam rotates to 180° relative to its initial position, the second valve cover is in the neutral position, and the first valve cover is in its second position uncovering the second passage and connecting the first passage to the outlet passage via the U-shaped channel defined in the first valve cover. Pressurized gas flows into the second passage and drives the first diaphragm in a second direction opposite to the first direction. The driving of the first diaphragm in the second direction causes gas on the first side of the diaphragm to be forced out of the first passage to the outlet passage via the U-shaped channel defined in the first valve cover. The driving of the first diaphragm in the second direction also causes the first cam rotation assembly to reciprocate and rotate the cam. As the cam rotates to 270° relative to its initial position, the first valve cover is in its neutral position, and the second valve cover is in its second position connecting the third passage to the outlet passage and uncovering the fourth passage. Pressurized gas flows from the gas meter housing into the fourth passage and forces the second diaphragm in the second direction. The driving of the second diaphragm in the second direction forces gas on the first side of the second diaphragm out of the second cavity through the third passage and to the outlet passage via the U-shaped channel defined in the second valve cover. The forcing of the second diaphragm in the second direction also rotates the cam to its initial position to begin another cycle of rotation.

Advantageously, by using two diaphragms in the gas meter of this invention, the cam can be more uniformly driven throughout a cycle of the gas meter so that it is less likely to become stuck, a problem which would otherwise lead to inaccurate metering and erratic gas flows from the outlet passage. Also, the cam drives the first and second arms reliably and steadily to reciprocate the first and second valve covers relative to prior art gas meters, and requires fewer parts compared to prior art gas meters. Further, the gas meter using the cam is relatively easy to manufacture and is more reliable and accurate relative to prior art gas meters.

These together with other objects and advantages, which will become subsequently apparent, reside in the details of construction and operation is more fully hereinafter described and claimed, reference being had to the accompanying drawings, forming a part hereof, wherein like numeral refer to like parts throughout.

BRIEF DESCRIPTION OF THE DRAWINGS

The present invention can be better understood with reference to the following drawings. The drawings are not necessarily to scale, emphasis instead being placed upon clearly illustrating principles of the invention.

DESCRIPTION OF THE PREFERRED EMBODIMENTS

Figure 1:
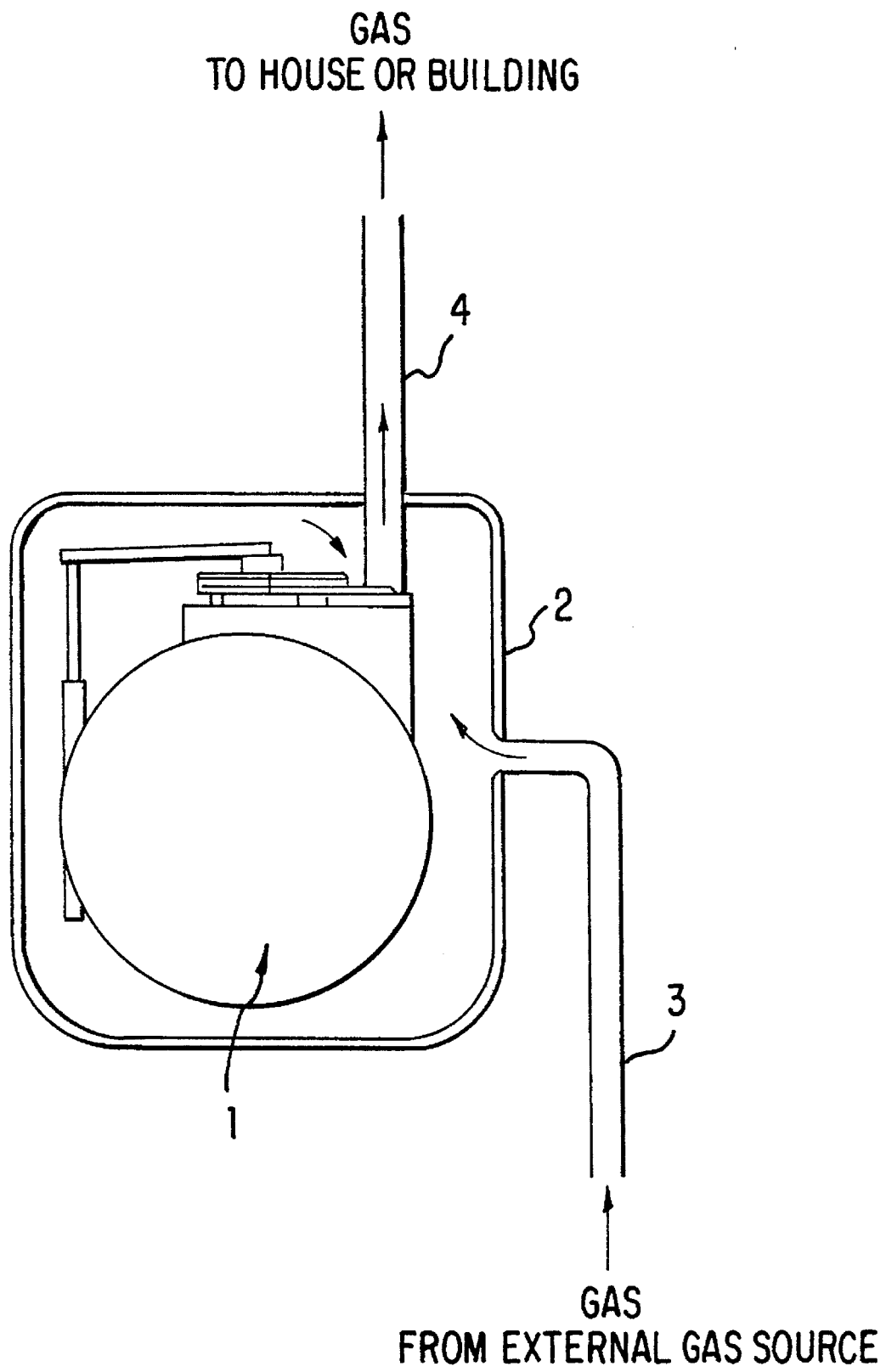
FIG. 1 is a cross-sectional view of a gas meter in accordance with this invention, housed in a gas meter housing.

FIG. 1 is a cross-sectional diagram of a gas meter 1 in accordance with this invention. The gas meter 1 is positioned in a gas meter housing 2 which receives gas from an external gas source via pipe 3. When a furnace or gas stove, for example, in a house of building is activated, gas flows in a pipe 4 to the house or building. The gas flow in the pipe 4 drives the gas meter 1 which generates a display (not shown in FIG. 1) indicating the amount of gas flow. As the gas flows in the pipe 4, pressurized gas from the pipe 3 is drawn into the gas meter 1 which continuously monitors and displays the volume of gas per unit of time flowing in the pipe 4. The display of the gas meter 1 can thus be used to determine gas usage in the house or building over a period of time.

Figure 2:
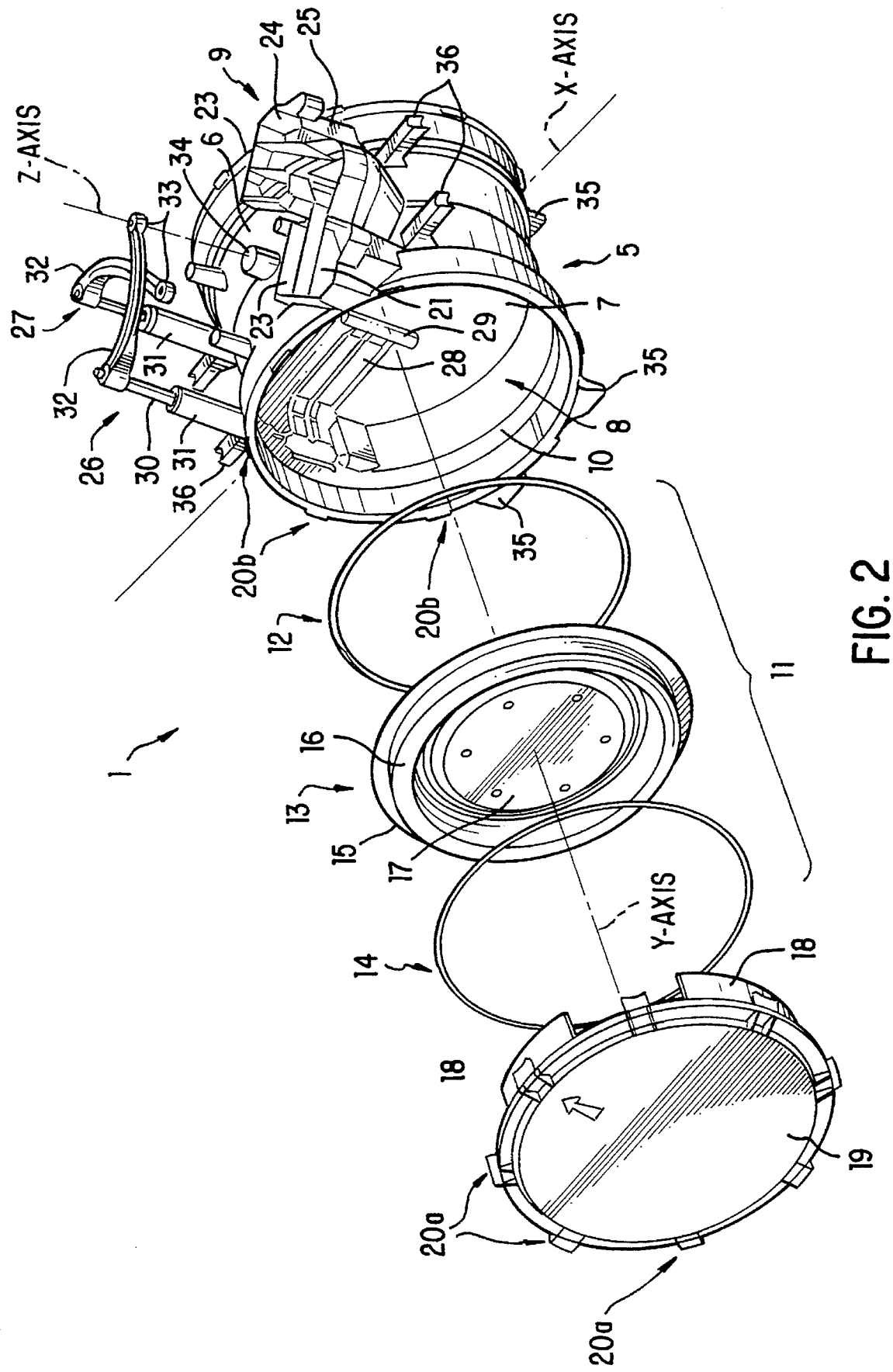
FIG. 2 is an exploded perspective view of a diaphragm housing and a portion of the first and second cam rotation assemblies, in accordance with this invention.

In FIG. 2, the gas meter 1 includes a diaphragm housing 5, primarily composed of plastic material such as polyvinyl chloride (PVC), including a cylinder 6 with a center partition 7 dividing the cylinder 6 into two open-sided enclosures 8 and 9 (the open-sided enclosure 9 cannot be seen in FIG. 2). The open-sided enclosures 8, 9 have respective ledges 10 defined therein. The ledges 10 receive respective diaphragm assemblies 11 (the diaphragm assembly 11 for the open-sided enclosure 9 is not shown in FIG. 2). The diaphragm assembly includes a first O-ring 12, a diaphragm 13 and a second O-ring 14. The first and second O-rings 12, 14 are formed from a plastic or rubber material and serve to define substantially air-tight enclosures on opposite sides of the diaphragm 13 when the diaphragm assembly 11 is inserted into the open-sided enclosures 8, 9. The diaphragm 13 includes a rim 15 preferably of a relatively hard material such as tin metal. The rim 15 holds the edges of a flexible, annular-shaped material 16 to which is attached a relatively hard center portion 17 preferably formed from tin metal. The diaphragm assembly 11 is held against the ledge 10 by ridges 18 of a side cover 19. The side cover 19 has hooked members 20a (not all of which are shown in FIG. 2) which engage with respective tabs 21b (not all of which are shown in FIG. 2) when the cover 19 is fitted to closed the open-sided enclosure 8 and rotated so that the hook members 20a slide over and engage with the tabs 21b. Similarly, the open-sided enclosure 9 is closed with a respective cover 19. When enclosed by respective covers 19, the gas meter 1 has first and second cavities on opposite sides of the center partition 7 or a plane defined by x-z axes in FIG. 2. Each of the first and second cavities is divided by a respective diaphragm 13 into first and second sections which are substantially air tight. The diaphragm housing 5 defines first, second, third and fourth passages 21, 22, 23, 24. The first passage 21 communicates with a first outer side of the first diaphragm 13 (i.e. the diaphragm 13 shown in FIG. 2) and the second passage 22 communicates with a second inner side of the first diaphragm 13. Similarly, the third passage 23 communicates with an inner, first side of a second diaphragm 13 (not shown in FIG. 2) and the fourth passage 24 communicates with a second, outer side of the second diaphragm 13. The diaphragm housing 5 also defines an outlet passage 25, substantially V-shaped through which gas flows out of the gas meter 1. As shown in FIG. 2, the first and second passages 21, 22 are arranged in proximity to a first end of the outlet passage 25 and on opposite sides thereof. Similarly, the third and fourth passages 23, 24 are disposed in proximity to a second end of the outlet passage 25 on opposing sides thereof. To selectively allow gas to flow into the gas meter 1 through the first, second, third and fourth passages 21, 22, 23 and 24 and to selectively allow gas to exit from the first, second, third and fourth passages 21, 22, 23 and 24 to the outlet passage 25, first and second valve covers (not shown in FIG. 2) are driven to reciprocate over the first and second passages 21, 22 and the first end of the outlet passage 25, and the third and fourth passages 23, 24 and the second end of the outlet passage 25. To drive the first and second valve covers, first and second cam rotation assemblies 26, 27 (parts of which are shown in FIG. 2) are included in the gas meter 1. The first and second cam rotation assemblies 26, 27 include respective flags 28 with a cylindrical member 29 disposed at one end thereof. The cylindrical member 29 has outer ends which slideably engage with guides attached at the center portion 17 of the diaphragms 13. As one of the first and second diaphragms 13 reciprocates from between an outer position toward the cover 19 and an inner position toward the center partition 7 under selective flows from the first and second passages 21 and 22 for the first diaphragm 13 or the third and fourth passages 23, 24 for the second diaphragm 13, the flag 28 is also driven to reciprocate with the diaphragm 13. The flag 28 of each diaphragm 13 is coupled to a respective flag axle 30 which reciprocally rotate in respective flag axle holders 31 defined in the diaphragm assembly 5. The reciprocal motion of the flag axles 30 of the diaphragms 13 causes respective first link arms 32 to move in a reciprocal motion. The link arms 32 are coupled by ends 33 to respective second link arms (not shown in FIG. 2) which have ends opposite the ends engaging with the pins 33 which meet and are held together at a link block (not shown in FIG. 2). The reciprocating motion of the first and second rotation assemblies 26, 27 causes the link block to be driven in a circular motion to rotate a cam (not shown in FIG. 2). The cam controls the reciprocal motion of the valve covers. The housing 5 also defines a cam axle receptacle 34 which receives the end of the axle supporting the cam. The housing 5 also has stabilizers 35 for supporting the cylinder 6 of the diaphragm housing 5. Also, the housing 5 defines members 36 to which screws can be attached to fix the gas meter 1 relative to the gas meter housing 2.

Figure 3:
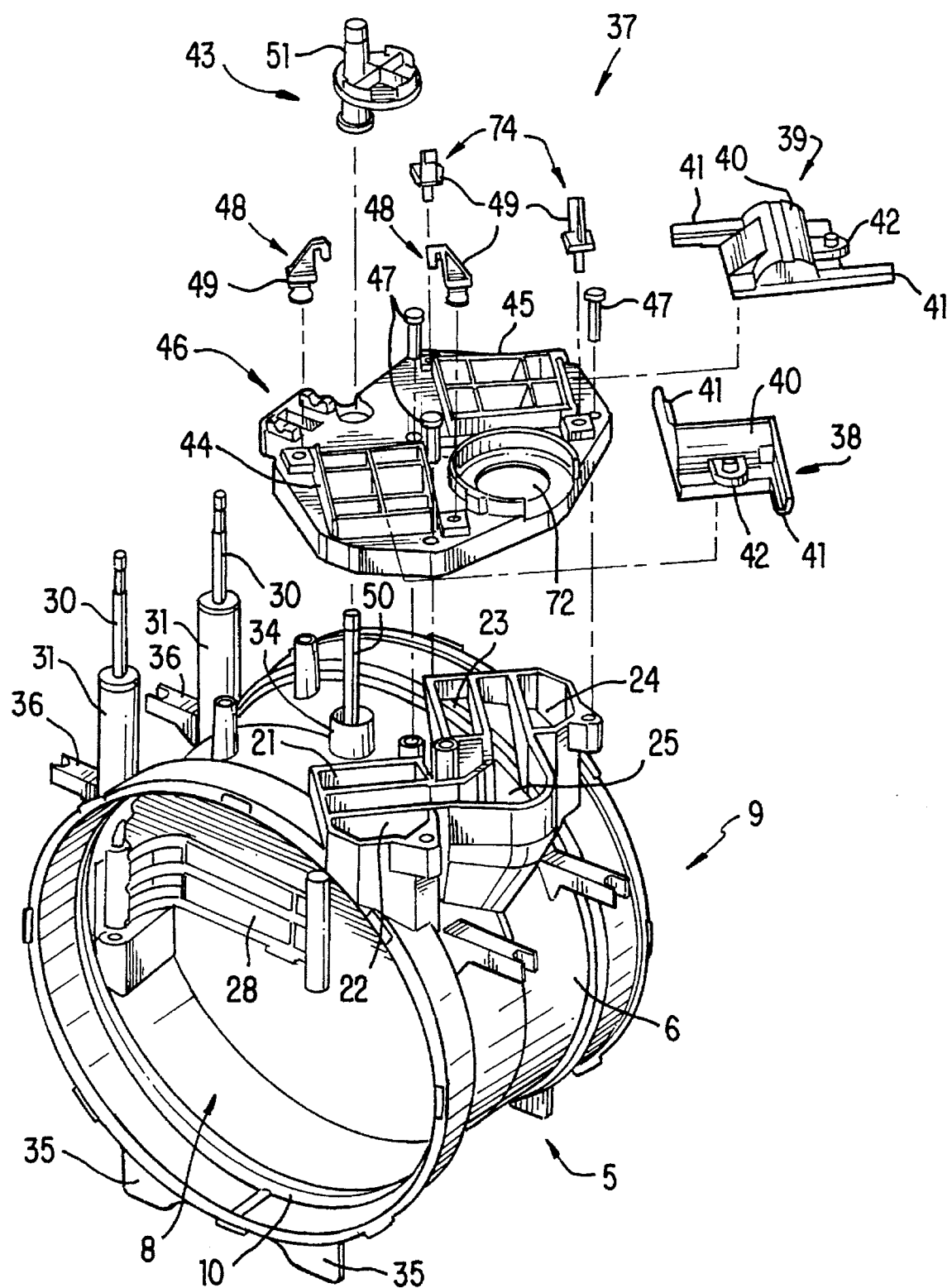
FIG. 3 is an exploded perspective view of the diaphragm housing and valve cover assembly in accordance with this invention.

In FIG. 3, a valve cover assembly 37 is shown with the diaphragm housing 5. The valve cover assembly 37 includes first and second valve covers 38, 39, made of a plastic material and defining respective U-shaped channels 40 which are concave viewed from the top side of the first and second valve covers 38, 39, as shown in FIG. 3, but which are convex if viewed from the undersides of the first and second valve covers 38, 39 (not shown in FIG. 3). The first and second valve covers 38, 39 each include slides 41 and pins 42 for receiving the ends of first and second arms (not shown in FIG. 3) having respective opposite ends coupled to the cam 43. The first and second valve covers 38, 39 are held into engagement with respective valve bases, 44, 45 defined in valve seat 46. The valve base 44 defines three apertures which correspond with and are extensions of the first passage 21, the outlet passage 25 and the second passage 22. Similarly, the valve base 45 defines three apertures which correspond with and are extensions of the third passage 23, the outlet passage 25 and the fourth passage 24. The valve seat 46 is mounted to the diaphragm housing 5 with screws 47. The valve base 44 also has a first guide assembly 48 including two hooked members 49 having hooks at one end and split pins at the other end which engage with the valve seat 46. The hooks of the hooked members 49 engage with respective slides 41 of the first valve cover 38 so that the valve covers 38, 39 are constrain to slide on respective valve bases 44, 45. Likewise, the valve base 45 has a second guide assembly 49 including two hooked members 49 having hooks at one end to receive respective slides 41 of the second valve cover 39, and at ends opposite the hooks, have split pins for engaging with the diaphragm housing 5.

A cam axle 50 is mounted in cam axle end holder 34. The cam axle 50 extends through an aperture defined in the valve seat 46 and is inserted into a cam axle receptacle 51 of the cam 43. The cam 43 is thus capable of rotation about cam axle 50.

Figure 4:
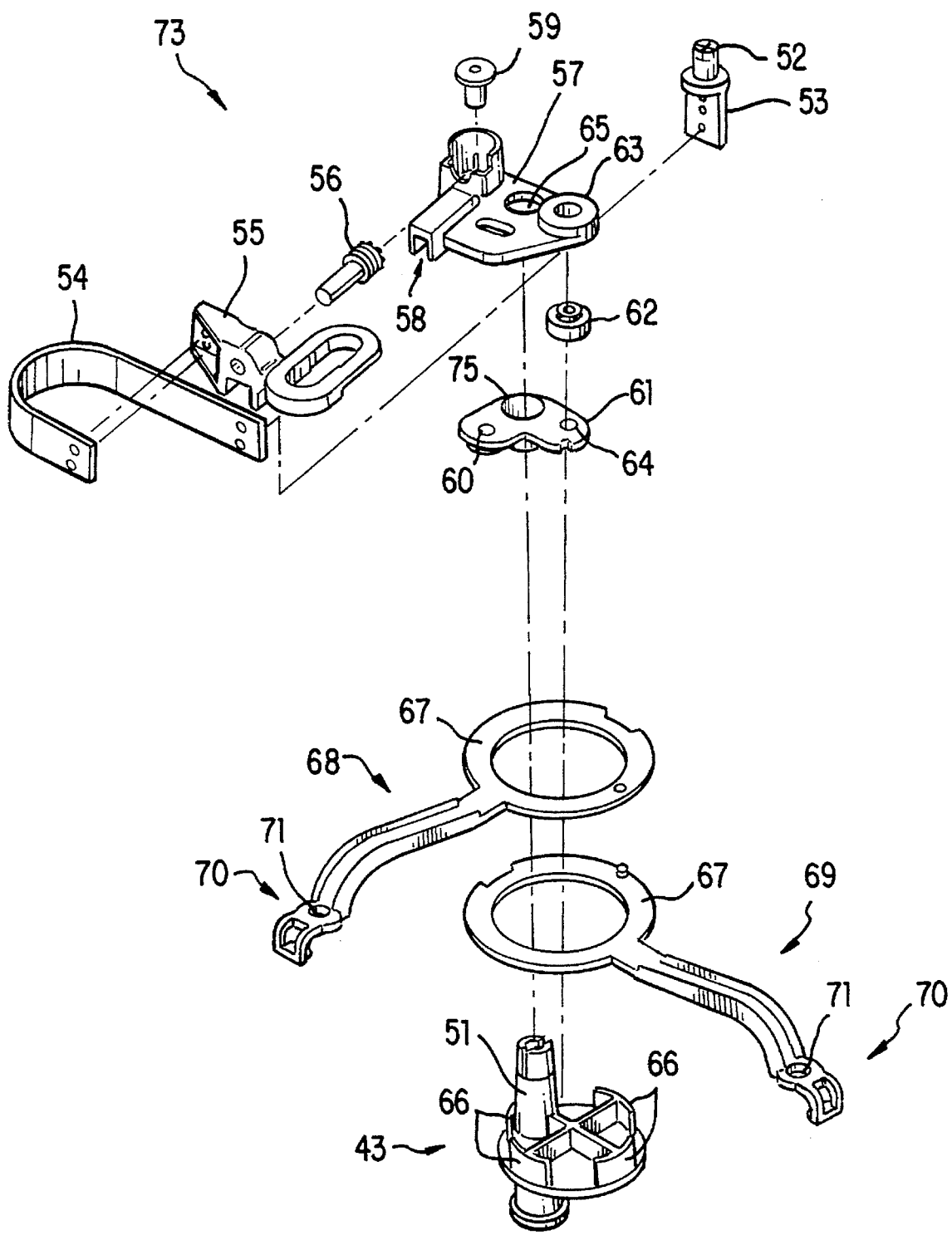
FIG. 4 is an exploded perspective view of a cam, arms, and a cam linkage assembly in accordance with this invention.

In FIG. 4, to couple the first and second cam rotation assemblies 26, 27 to rotate the cam 43, the ends of the second link arms of respective first and second cam rotation assemblies 26, 27, are coupled to a pin 52 formed on link block 53 which is a part of a cam linkage assembly 73 common to both the first and second cam rotation assemblies 26, 27. The link block 53 can be made of a plastic material, for example. The link block 53 is coupled to one end of a J-shaped metal member 54 by two rivets. At the other end of the J-shaped member 54, a metal tangent block 55 is mounted with two rivets. The block 55 defines a threaded aperture to receive a metal screw 56. An upper tangent plate 57 defines a groove 58 that receives the elongated, relatively thin portion of the screw 56. The upper tangent plate 57 also defines a stop at an end of the groove 58 (not shown in FIG. 4), which holds the head of the screw 56 so that the tangent block 55 is fixed to the upper tangent plate 57. A metal screw 59 is inserted through an aperture in the upper tangent plate 57 and engages with a corresponding aperture 60 defined in lower tangent plate 61o A timing cam 62 is rotatably coupled in apertures 63 and 64 of the upper and lower tangent plates 57, 61, respectively. The upper tangent plate 57 also defines an aperture 65 which receives an end of the cam axle receptacle 51 for rotation therein. The lower tangent plate 61 also receives the end of the cam axle receptacle 51 in aperture 75 but is fixed relative to the cam axle receptacle 51. Thus, the lower tangent plate 61 is fixed to the cam 43 to drive the cam 43 in a circular motion about an axis defined by the cam axle receptacle 51.

The cam 43 is preferably formed of plastic material, and has outer surfaces 66 which receive respective inner surfaces of rings 67 defined at first ends of a first arm 68 and a second arm 69, also preferably formed from plastic material. Although the outer surfaces 66 of the cam 43 are not continuous, but are segmented, the outer surfaces 66 could be continuous if friction against the inner surfaces of ring 67 does not impede rotation of the cam 43. The second ends 70 of respective first and second arms 68, 69 receive respective pins 42 of the first and second valve covers 38, 39 in apertures 71.

Figure 5:
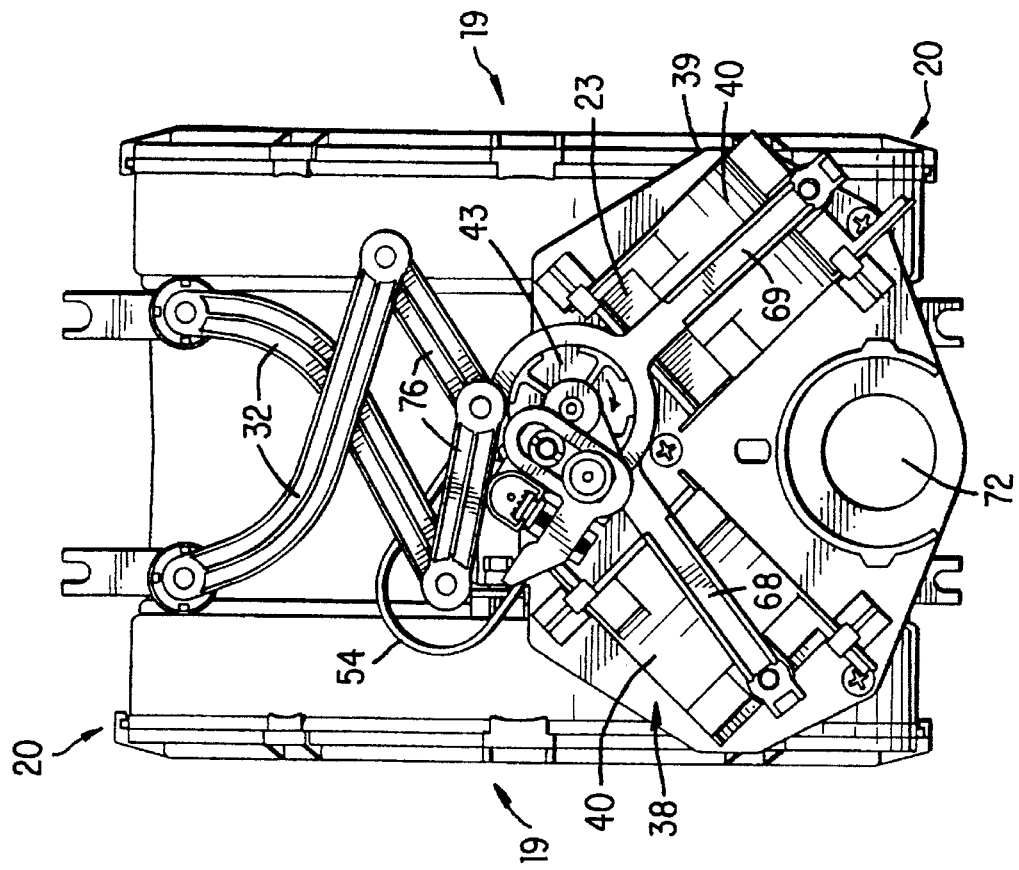
FIG. 5 is a view of the valve cover assembly, the cam, cam linkage assembly, and parts of the first and second cam rotation assemblies in a first position in the cycle of the gas meter.
Figure 6:
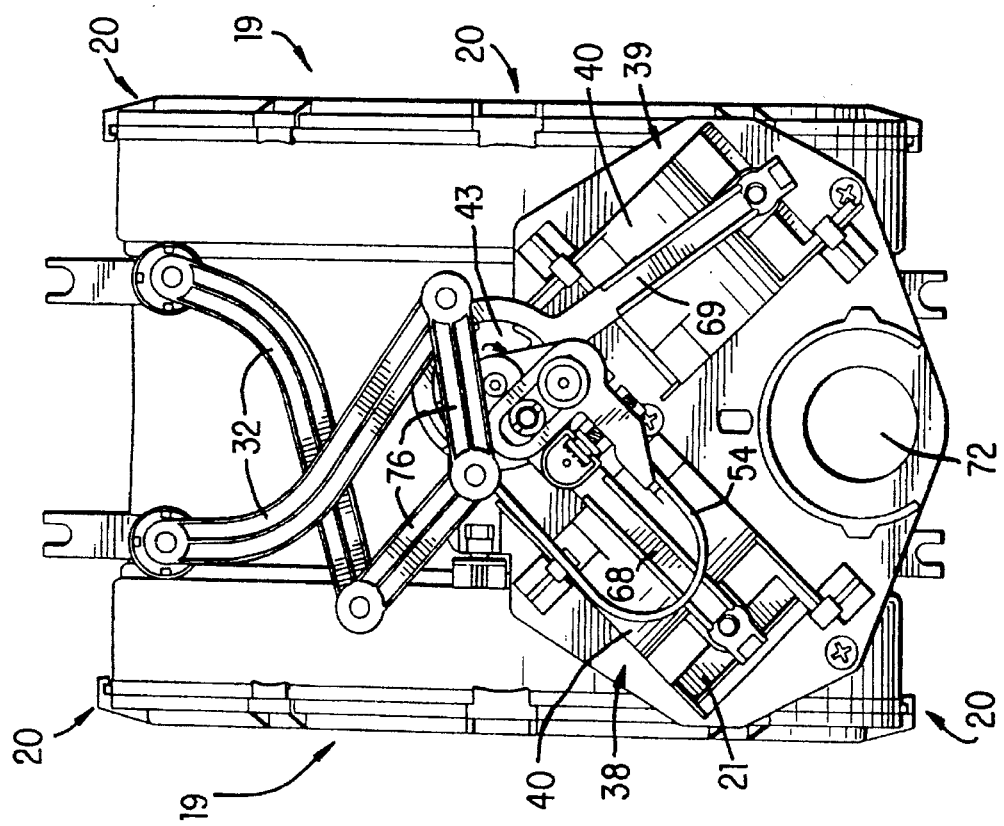
FIG. 6 is a view of a second position of the valve cover assembly, the cam, the cam linkage assembly and parts of the first and second cam rotation assemblies in the cycle of the gas meter.
Figure 8:
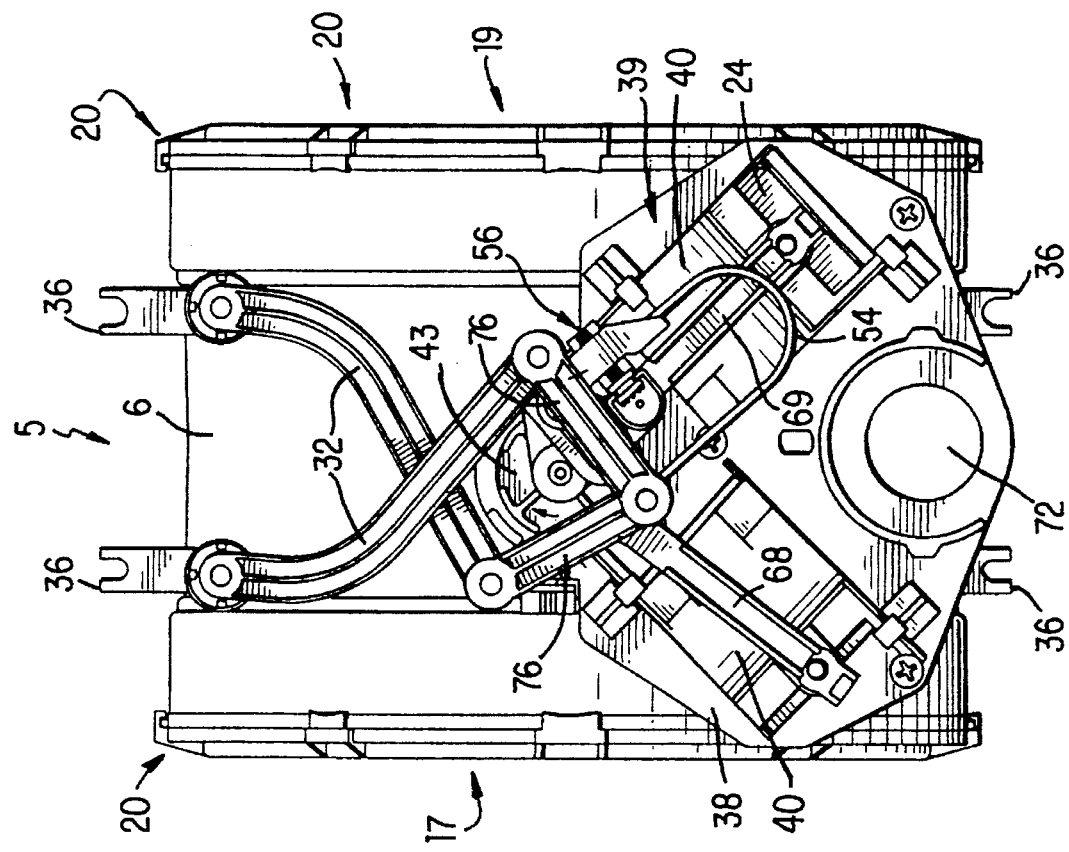
FIG. 8 is a view of a fourth position of the valve cover assembly, the cam, the cam linkage assembly, and parts of the first and second cam rotation assemblies in the cycle of the gas meter.
Figure 7:
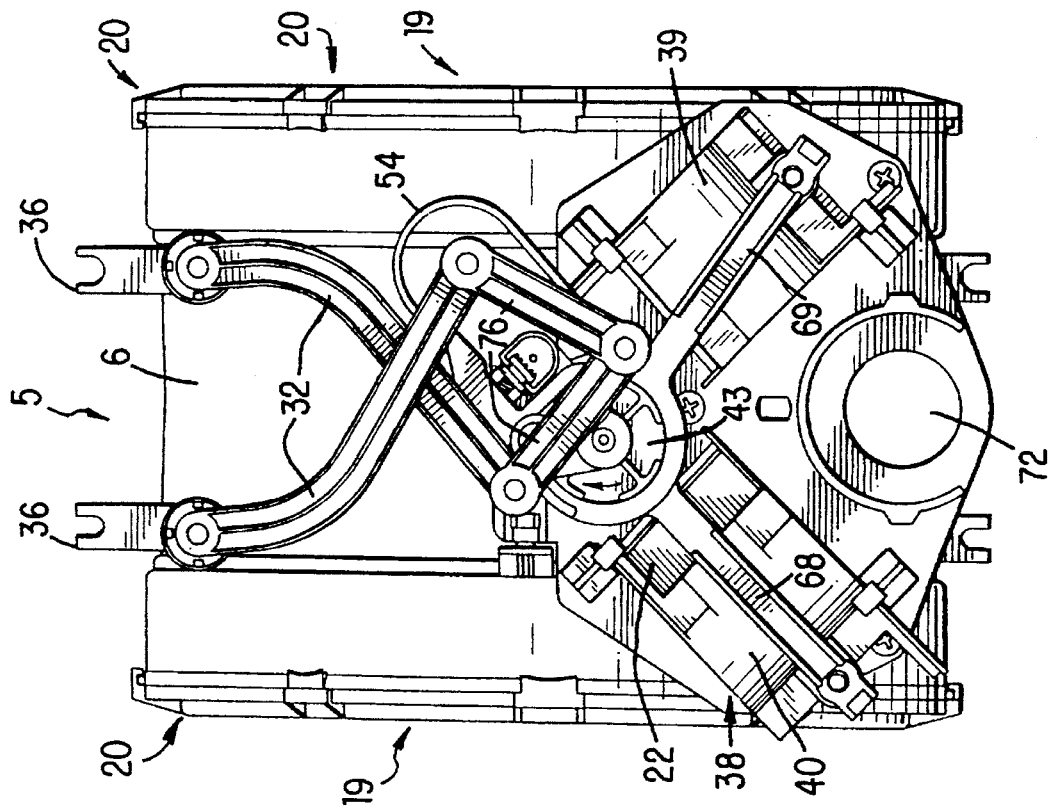
FIG. 7 is a third position of the valve cover assembly, the cam, the cam linkage assembly, and the first and second cam rotation assemblies in the cycle of the gas meter.

The operation of the gas meter 1 is described with reference to the top views of the gas meter 1 shown in FIGS. 5–8 and the motion profiles of FIGS. 9A–9D. As shown in FIG. 1, the gas meter 1 is positioned in the gas meter housing 2 and receives the gas meter housing 2 and receives gas from an external gas source via pipe 3. The metered gas flow from the gas meter 1 flows to a location such as a house or building, for example, through the pipe 4 which is coupled to communicate with the outlet passage 25 to valve seat aperture 72 (See FIG. 3). Assume that a gas burning unit such as a stove or furnace is activated in the house or building connected to the pipe 4. Gas begins to flow in the pipe 4. In FIG. 5, the first valve cover 38 is in a first position in which the first passage 21 is uncovered and receives pressurized gas contained in the gas meter housing 2. The first valve cover 38 also connects the second passage 22 to the outlet passage 25 via its U-shaped channel 40. Pressurized gas flows into the first passage 21 and expands the first diaphragm in a first direction (i.e., along the y-axis in FIG. 2) toward the center of the diaphragm housing 5. This action causes gas on the second side of the diaphragm to be forced out of the second passage 22 against the U-shaped channel 40 of the first valve cover 38, which redirects the flow to the outlet passage 25 and into the pipe 4. As the first diaphragm is forced in the first direction by gas entering the first passage 21, the first cam rotation assembly 26 drives the cam 43 to rotate by 90°. The rotation of the cam 43 causes the second valve cover 39 to move from a neutral position to a first position in which the third passage 23 is uncovered and the U-shaped channel 40 of the second valve cover 39 overlies and connects the fourth passage 24 to the outlet passage 25, as shown in FIG. 6. At this point, the first valve cover 38 is in a neutral position in which the first and second passages 21, 22 are closed and the U-shaped channel 40 of the first valve cover 38 overlies the outlet passage 25, as shown in FIG. 6. Pressurized gas from the gas meter housing 2 enters the third passage 23 and forces a first side of the second diaphragm 13 on the right side of the gas meter 1 to move in the first direction outwardly of the center of the gas meter 1. This action forces gas on the second side of the second diaphragm 13 to be forced out of the fourth passage 24 against the U-shaped channel 40 of the second valve cover 39 which redirects the flow to the outlet passage 25 and into the pipe 4. The outward expansion of the second diaphragm 13 also drives the cam 43 to rotate by 90°. After this rotation of the cam 43, the second valve cover 39 is in a neutral position in which the third and fourth passages 23, 24 are closed and the U-shaped channel 40 of the second valve cover 39 overlies the outlet passage 25, as shown in FIG. 7. The first valve cover 38 is now positioned so that the second passage 22 is uncovered and the first passage 21 is in communication with the outlet passage 25 via the U-shaped channel 40 of the first valve cover 38. The uncovering of the second passage 22 allows pressurized gas from the gas meter housing 2 to enter into the second passage 22 and expand the first diaphragm 13 outwardly of the center of the gas meter 1 in a second direction opposite to the first direction. The outward expansion of the first diaphragm 13 forces gas on the first side of the first diaphragm 13 through the first passage 21 against the U-shaped channel 40 of the first valve cover 38 which redirects this flow to the outer passage 25 and into the pipe 4. The outward expansion of the first diaphragm 13 in the second direction also causes the first cam rotation assembly 26 to reciprocate and drive the cam 43 in a clockwise direction via the cam linkage assembly 73. The first cam rotation assembly 26 and the cam linkage assemblies 73 thus force the cam 43 to rotate by 90°. At this point, as shown in FIG. 8, the first valve cover 38 is in a neutral position blocking the first and second passages 21, 22 with its U-shaped channel 40 overlying the out let passage 25. The second valve cover 39 is in a position in which the third passage 23 communicates with the outlet passage 25 via the U-shaped channel 40 of the second valve cover 39. In the second position of the second valve cover 39, the fourth passage 24 is uncovered and receives pressurized gas contained in the gas meter housing 2. The pressurized gas thus flows into the fourth passage 24 and forces the second diaphragm 13 in the second direction toward the center of the gas meter 1. This movement of the second diaphragm 13 forces gas on the first side of the second diaphragm 13 through the third passage 23 against the U-shaped channel 40 of the second valve cover 39 which redirects this flow into the outlet passage 25 and into the pipe 4. The movement of the second diaphragm 13 in the second direction also drives the second cam rotation assembly 27 to rotate the cam linkage assembly 73 and therefore the cam 43 by 90° in a clockwise direction. The cam 43 of the gas meter 1 thus return to its initial position shown in FIG. 5. The above cycle of the cam 43 continues as long as gas is allowed to flow in the pipe 4 by activating a gas-burning unit in the house or building. Based on the rotation of the cam 43, the meter 1 generates a display (not shown) indicating the amount of gas flowing in pipe 4 over a period of time. The display can be generated using an optic eye which generates an electric pulse once each cycle of the cam 43 when a member rotating with the cam 43 passes under the optic eye and interrupts light generated by a light source from reaching the optic eye. Alternatively, a pressure sensor can be coupled to the outlet passage 25 or the pipe 4 to detect fluctuations in the pressure pulse as the cam 43 rotates. The pressure sensor generates a signal provided to a display to indicate the amount of gas flowing through the pipe 4. Alternatively, a magnetic sensor can be positioned in proximity to the center portion 17 of one of the diaphragms 13 to generate a signal indicative of the proximity of the diaphragm 13 to the magnetic sensor. The output of the magnetic sensor can be coupled to the display to indicate the amount of gas flow in the pipe 4. Alternatively, the cam axle receptacle 4 can have spiral threads formed thereon for meshing with a gear to turn a dial indicative of the amount of gas flow in the pipe 4.

Figure 9A:
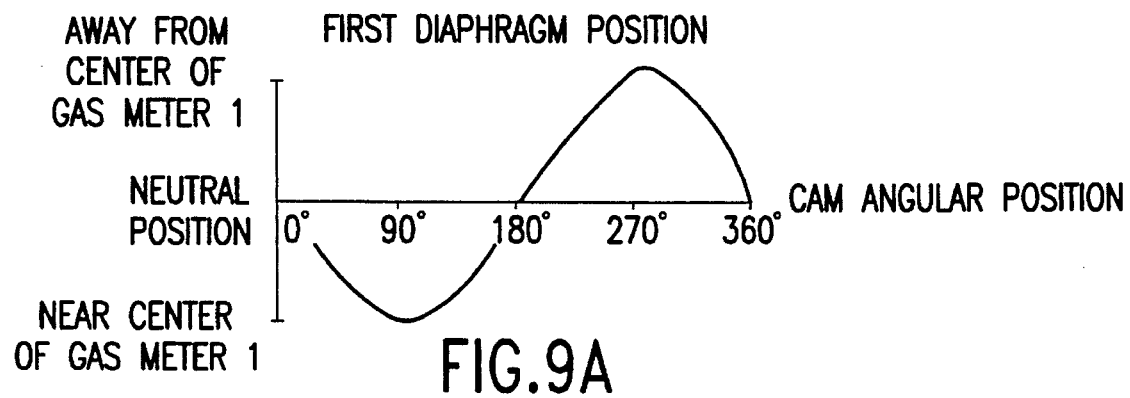
FIGS. 9A to 9D illustrate motion profiles for the first and second diaphragms and for the first and second valve covers.

FIG. 9A is a motion profile of the position of the first diaphragm 13 relative to the center of the gas meter 1, as a function of cam angular position. The first diaphragm 13 begins an initial position at a cam angular position of zero degrees (0°), moves near the center of the gas meter 1 at a cam angular position of 90° moves to a neutral position at a cam angular position of 180°, moves away from the center of the gas meter 1 at a cam angular position of 270° and returns to the neutral position at a cam angular position of 360° or 0°.

Figure 9B:
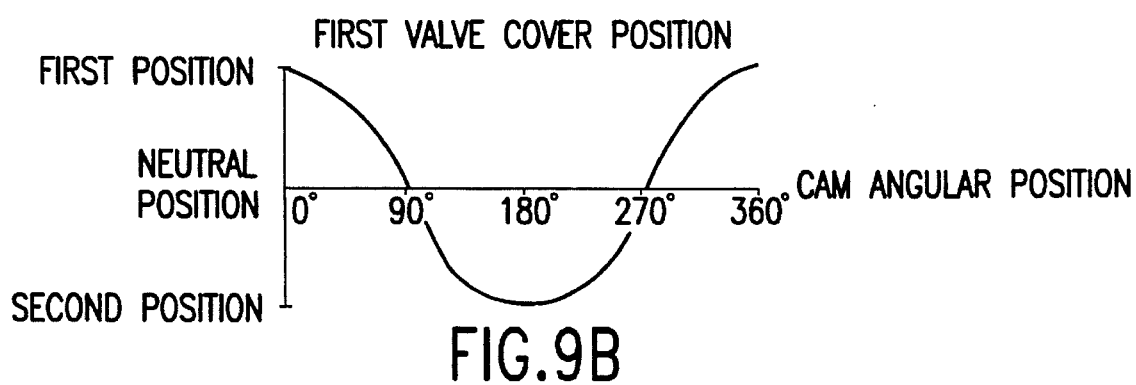

FIG. 9B is a motion profile of the first valve cover position as a function of cam angular position. In FIG. 9B, the first valve cover 38 is in the first position in which the first passage 21 is uncovered and the first valve cover 38 couples the second passage 22 to the outlet passage 25. At a cam angular position of 90°, the first valve cover 38 is in a neutral position. At a cam angular position of 180°, the first valve cover 38 is in a second position uncovering the second passage 22 and coupling the first passage 21 to the outlet passage 25. At a cam angular position of 270°, the first valve cover 38 is in a neutral position. At a cam angular position of 360° or 0°, the first valve cover 38 is in the first position thereof.

Figure 9C:
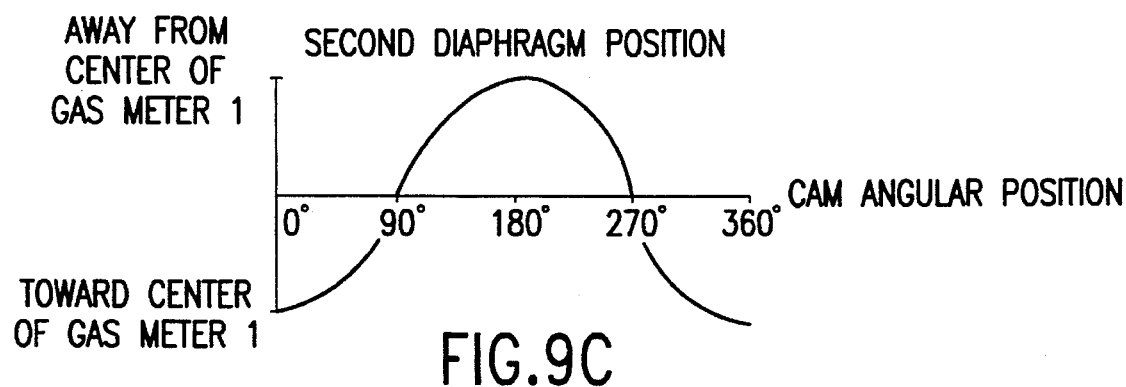

In FIG. 9C, the position of the second diaphragm 13 relative to the center of the gas meter 1 is shown as a functional cam angular position. At a cam angular position of 0°, the second diaphragm is toward the center of the gas meter 1. At a cam angular position of 90°, the second diaphragm 13 is at a neutral position. At a cam angular position of 180°, the second diaphragm 13 is positioned away from the center of the gas meter 1. At a cam angular position of 270°, the second diaphragm 13 returns to its neutral position. At a cam angular position of 360° or 0°, the second diaphragm 13 returns toward the center of the gas meter 1.

Figure 9D:
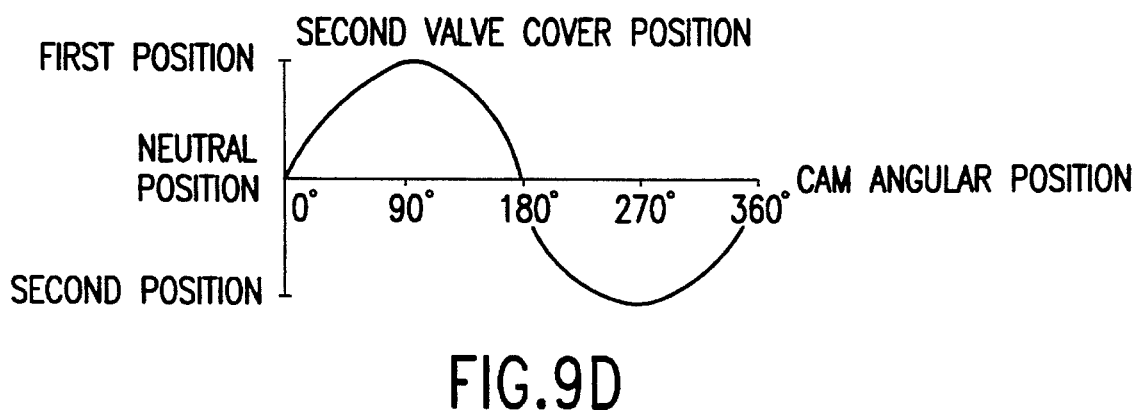

FIG. 9D is a motion profile of the position of the second valve cover 39 relative to the cam angular position. At a cam angular position of 0°, the second valve cover 39 is in a neutral position. At a cam angular position of 90°, the second valve cover is in a first position uncovering the third passage 23 and coupling the fourth passage 24 to the outlet passage 25. At a cam angular position of 180°, the second valve cover 39 returns to its neutral position. At a cam angular position of 270°, the second valve cover 39 is in a second position in which the fourth passage 24 is uncovered and the second valve cover 39 couples the third passage 23 to the outlet passage 25. At a cam angular position of 360 or 0°, the second valve cover 39 returns to its neutral position.

The gas meter 1 of this invention provides several advantages relative to the prior art. For one, the cam 43, its first and second arms 68, 69 used to drive the first and second valve covers 38, 39 respectively, and the first and second cam rotation assemblies 26, 27, are relative easy to manufacture relative to prior art gas meters. Further, the first and second cam rotation assemblies 26, 27 ensure that the cam 43 is continuously driven in its circular rotation so that the gas meter 1 of this invention is reliable, generates an accurate display of gas consumption, and provides a steady flow of gas from the gas meter 1. In addition, the gas meter 1 of this invention is relatively easy to manufacture and requires fewer parts than prior art gas meters.

Although the invention has been described with specific embodiments and illustrations, several modifications can be made to the preferred embodiments of the gas meter 1 without departing from the scope of this invention. For example, all components of the gas meter 1 can be made from different materials to those described herein without departing from the scope of the invention. Further, the passages defined in the gas meter 1 can be modified in numerous ways without departing from the scope of this invention. Also, the first and second cam rotation assemblies 26, 27 and the cam linkage assembly 73 can be modified in several ways without departing from the scope of this invention, the main purpose of these assemblies being to rotate the cam 43 steadily to drive the first and second valve covers 38, 39. Also, the cam 43 can be modified in many ways including the use of non-circular surfaces to drive arms attached to the first and second valve covers 38, 39. These modifications are intended to be included within the scope of this invention as outlined in the following claims.

Wherefore, the following is claimed:

1. A gas meter comprising:
   a housing defining first and second cavities, and defining an outlet passage with first and second ends, the housing defining first and second passages on opposite sides of the outlet passage in proximity to the first end of the outlet passage, and the housing defining third and fourth passages on opposite sides of the outlet passage in proximity to the second end of the outlet passage;
   a first diaphragm mounted to the housing in the first cavity, the first and second passages communicating with opposite sides of the first diaphragm;
   a second diaphragm mounted in the second cavity of the housing, the third and fourth passages communicating with opposite sides of the second diaphragm;
   a first cam rotation assembly coupled to the first diaphragm;
   a second cam rotation assembly coupled to the second diaphragm;
   a cam coupled to and rotated by the first and second cam rotation assemblies;
   a first valve cover slidably mounted to reciprocate between a first position uncovering the first passage and connecting the second passage to the outlet passage, and a second position uncovering the second passage and connecting the first passage with the outlet passage;
   a second valve cover slidably mounted to reciprocate between a first position uncovering the third passage and coupling the fourth passage to the outlet passage, and a second position connecting the fourth passage to the outlet passage and uncovering the third passage;
   a first arm coupled between the cam and the first valve cover, to reciprocate the first valve cover between the first and second positions of the first valve cover as the cam rotates; and
   a second arm coupled between the cam and the second valve cover, to reciprocate the second valve cover between first and second positions of the second valve cover as the cam rotates.

2. A gas meter as claimed in claim 1, wherein the gas meter is positioned in a cavity defined by a gas meter housing receiving pressurized gas from an external gas source through a first pipe coupled to the gas meter housing, a second pipe communicating with the outlet passage of the gas meter to provide a metered gas flow to a predetermined location.

3. A gas meter as claimed in claim 1, wherein the first cam rotation assembly includes:
   a flag having a first end slidably coupled to the first diaphragm and having a second end;
   a flag axle rotatably mounted in the housing, having a first end coupled to the second end of the flag and having a second end;
   a jointed linkage arm having a first end coupled to the second end of the flag axle, and having a second end; and a cam linkage assembly coupled between the jointed linkage arm and the cam.

4. An apparatus as claimed in claim 1, wherein the first arm has a first end with a ring fitted over the cam, and a second end rotatably coupled to the first valve cover.

5. An apparatus as claimed in claim 1, wherein the first valve cover defines a U-shaped channel for connecting the second passage to the outlet passage in the first position of the first valve cover, and for connecting the first passage with the outlet passage in the second position of the first valve cover.

6. An apparatus as claimed in claim 1, further comprising:

a first guide assembly slidably mounting the first valve cover to the housing.

7. An apparatus as claimed in claim 1, further comprising:

a cam axle mounted to the housing and receiving the cam for rotation thereon.

8. A gas meter as claimed in claim 1, wherein the reciprocation of the first diaphragm is out-of-phase with the reciprocation of the second diaphragm.

9. An apparatus as claimed in claim 8, wherein the reciprocation of the first diaphragm is approximately 90° out-of-phase with the reciprocation of the second diaphragm.

10. A method for reciprocating a first valve cover between first and second positions of the first valve cover, the first position of the first valve cover uncovering a first passage and connecting a second passage to an outlet passage, the second position of the first valve cover uncovering the second passage and connecting the first passage to the outlet passage, the first, second and outlet passages being defined in a housing, the first passage communicating with a first side of a first diaphragm enclosed in the housing and the second passage communicating with a second side of the first diaphragm, the method comprising the steps of:

a) receiving a pressurized gas through the first passage;

b) forcing the first side of the first diaphragm in a first direction, based on said step (a);

c) rotating a cam coupled to the first valve cover, to move the first valve cover toward the second position of the first valve cover, based on said step (b).

11. A method as claimed in claim 10, further comprising the steps of:

d) receiving pressurized gas through the second passage;

e) forcing the second side of the first diaphragm in a second direction opposite to the first direction, based on said step (d); and f) rotating the cam to move the first valve cover, toward the first position of the first valve cover based on said step (e).

12. A method as claimed in claim 11, wherein the method is for reciprocating a second valve cover between first and second positions of the second valve cover, the first position of the second valve cover uncovering a third passage defined in the housing, the third passage communicating with a first side of a second diaphragm enclosed in the housing, and connecting a fourth passage defined in the housing and communicating with a second side of the second diaphragm and the outlet passage, and a second position of a second valve cover in which the second valve cover connects the third passage to the outlet passage, and uncovers the fourth passage, the method further comprising the steps of:

after said steps (a)–(c), g) receiving a pressurized gas through the third passage;

h) forcing the first side of the second diaphragm in the first direction, based on said step (g); and i) rotating the cam to reciprocate the first and second valve covers, based on said step (h).

13. A method as claimed in claim 12, further comprising the steps of:

after said steps (d)–(f), j) receiving a pressurized gas through the fourth passage;

k) forcing the second side of the second diaphragm in the second direction based on said step (j); and l) rotating the cam to reciprocate the first and second valve covers, based on said step (k).

* * * * *